US010796329B2

(12) United States Patent
Arora

(10) Patent No.: US 10,796,329 B2
(45) Date of Patent: Oct. 6, 2020

(54) METHOD AND SYSTEM FOR AUTHENTICATION OF COUPONS VIA BLOCKCHAIN

(71) Applicant: Mastercard International Incorporated, Purchase, NY (US)

(72) Inventor: Ankur Arora, Jasola (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 742 days.

(21) Appl. No.: 15/363,110

(22) Filed: Nov. 29, 2016

(65) Prior Publication Data
US 2018/0150865 A1 May 31, 2018

(51) Int. Cl.
| G06Q 30/02 | (2012.01) |
| G06F 16/2455 | (2019.01) |
| G06Q 20/06 | (2012.01) |
| G06Q 20/36 | (2012.01) |
| G06Q 20/38 | (2012.01) |

(Continued)

(52) U.S. Cl.
CPC ..... *G06Q 30/0225* (2013.01); *G06F 16/2455* (2019.01); *G06Q 20/065* (2013.01); *G06Q 20/20* (2013.01); *G06Q 20/36* (2013.01); *G06Q 20/3678* (2013.01); *G06Q 20/389* (2013.01); *G06Q 20/3829* (2013.01);

(Continued)

(58) Field of Classification Search
CPC .................................................. G06Q 30/0225
USPC ....................................................... 705/14.26
See application file for complete search history.

(56) References Cited

U.S. PATENT DOCUMENTS

2009/0144164 A1 6/2009 Wane et al.
2015/0324764 A1 11/2015 Van Rooyen et al.
(Continued)

FOREIGN PATENT DOCUMENTS

WO 03/044711 A1 5/2003
WO 2016/007904 A1 1/2016

OTHER PUBLICATIONS

Notification of Transmittal of the International Search Report and the Written Opinion of the International Searching Authority (Forms PCT/ISA/220, PCT/ISA/210 and PCT/ISA/237) dated Nov. 22, 2017, by the European Patent Office in corresponding International Application No. PCT/US2017/055727. (14 pages).

(Continued)

Primary Examiner — Daniel M Sorkowitz
(74) Attorney, Agent, or Firm — Buchanan Ingersoll & Rooney PC

(57) ABSTRACT

A method for authentication of coupons using a blockchain includes: storing transaction data for a payment transaction, wherein the transaction data includes at least a transaction amount; receiving an identification value; receiving a block included in a blockchain, wherein the block includes at least a block header and a plurality of transaction values, each transaction value including at least a coupon identifier and coupon data; executing a query on the received block to identify a specific transaction value of the plurality of transaction values where the included coupon identifier corresponds to the received identification value; and executing a query on the memory to update at least the transaction amount included in the stored transaction data based on the coupon data included in the identified specific transaction value.

18 Claims, 6 Drawing Sheets

(51) Int. Cl.
*G06Q 20/20* (2012.01)
*G06Q 20/40* (2012.01)

(52) U.S. Cl.
CPC ....... *G06Q 20/409* (2013.01); *G06Q 30/0207* (2013.01); *G06Q 30/0238* (2013.01)

(56) References Cited

U.S. PATENT DOCUMENTS

| | | | |
|---|---|---|---|
| 2015/0348169 A1* | 12/2015 | Harris | G06Q 30/0633 705/26.8 |
| 2016/0012465 A1* | 1/2016 | Sharp | G06Q 20/18 705/14.17 |
| 2016/0267474 A1 | 9/2016 | Lingham et al. | |
| 2017/0364936 A1* | 12/2017 | Balfour | G06Q 30/0222 |
| 2018/0053161 A1* | 2/2018 | Bordash | G06Q 20/102 |
| 2018/0109541 A1* | 4/2018 | Gleichauf | H04L 63/123 |

OTHER PUBLICATIONS

Antonopoulos, "Mastering Bitcoin: Unlocking Digital Cryptocurrencies," The O'Reilly, 2015, pp. 1-298, O'Reilly Media, Inc.

\* cited by examiner

METHOD AND SYSTEM FOR AUTHENTICATION OF COUPONS VIA BLOCKCHAIN

FIELD

The present disclosure relates to the authentication of coupons using a blockchain, specifically the storage of coupon data in a blockchain to ensure redemption only by authorized individuals and immutability of coupon data.

BACKGROUND

Coupons and other deals and offers are often provided by merchants, manufacturers, retailers, and other entities in an effort to gain increased business from consumers. Coupons can be useful tools for getting increased business from a past customer, or to entice a consumer to transact with the entity for the very first time in the hopes that they will become a regular customer. In many cases, the redemption of a coupon may result in a loss for the entity, where the entity hopes that the loss is mitigated by increased business that results from the use of the coupon.

Traditionally, coupons have been issued to the public, where any consumer may be able to come across a coupon, bring it to the entity, and redeem it to gain the coupon's benefit. Unfortunately, in cases where redemption of the coupon results in a loss for an entity, a mass redemption of the coupon at the entity can result in a significant, and sometimes catastrophic, loss that cannot be offset by any related increase in regular business. As a result, some entities have begun to issue unique coupons that may only be redeemed once or a predetermined number of times, such that point of sale systems can recognize earlier redemptions of the coupon and prohibit future redemptions once the number has been reached. However, while this may limit the number of redemptions, there is no guarantee that the coupon will not be shared or transferred to unintended recipients, prohibiting the entity from reaching their desired market.

Some systems have been developed that directly associate a coupon with a transaction account, to ensure that only the specified transaction account is eligible to redeem the coupon. However, this requires the entity to store data regarding coupons that are associated with transaction accounts, which can be resource-intensive and subject to data manipulation. In addition, the entity must offer a suitable interface for the consumers to access the data storage to identify what coupons have been associated with their transaction account.

Thus, there is a need for a technological solution whereby coupons can be issued to an individual for redemption only by the individual, and where the system relies on a publicly accessible data source to enable implementation without the use of additional resources for the issuing entity.

SUMMARY

The present disclosure provides a description of systems and methods for authentication of coupons using a blockchain. A blockchain is used to store and track coupon data, such that the issuing entity is not required to store or manage any data, thereby freeing up resources and processing power for the entity. In addition, the use of a blockchain ensures that the coupon data is publicly accessible, such as for viewing by the associated individuals as well as the issuing entities, and that such data is immutable and not subject to tampering or fraud. This can, in turn, decrease a merchant's likelihood of redeeming fraudulent coupons and thus enable the entity to issue coupons with a higher loss, which can be more enticing to consumers and result in increased revenue that more greatly outweighs the loss.

A method for authentication of coupons using a blockchain includes: storing, in a memory of a point of sale device, transaction data for a payment transaction, wherein the transaction data includes at least a transaction amount; receiving, by a receiving device of the point of sale device, an identification value; receiving, by the receiving device of the point of sale device, a block included in a blockchain, wherein the block includes at least a block header and a plurality of transaction values, each transaction value including at least a coupon identifier and coupon data; executing, by a querying module of the point of sale device, a query on the received block to identify a specific transaction value of the plurality of transaction values where the included coupon identifier corresponds to the received identification value; and executing, by the querying module of the point of sale device, a query on the memory to update at least the transaction amount included in the stored transaction data based on the coupon data included in the identified specific transaction value.

A system for authentication of coupons using a blockchain includes: a memory of a point of sale device configured to store transaction data for a payment transaction, wherein the transaction data includes at least a transaction amount; a receiving device of the point of sale device configured to receive an identification value, and a block included in a blockchain, wherein the block includes at least a block header and a plurality of transaction values, each transaction value including at least a coupon identifier and coupon data; and a querying module of the point of sale device configured to execute a query on the received block to identify a specific transaction value of the plurality of transaction values where the included coupon identifier corresponds to the received identification value, and a query on the memory to update at least the transaction amount included in the stored transaction data based on the coupon data included in the identified specific transaction value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
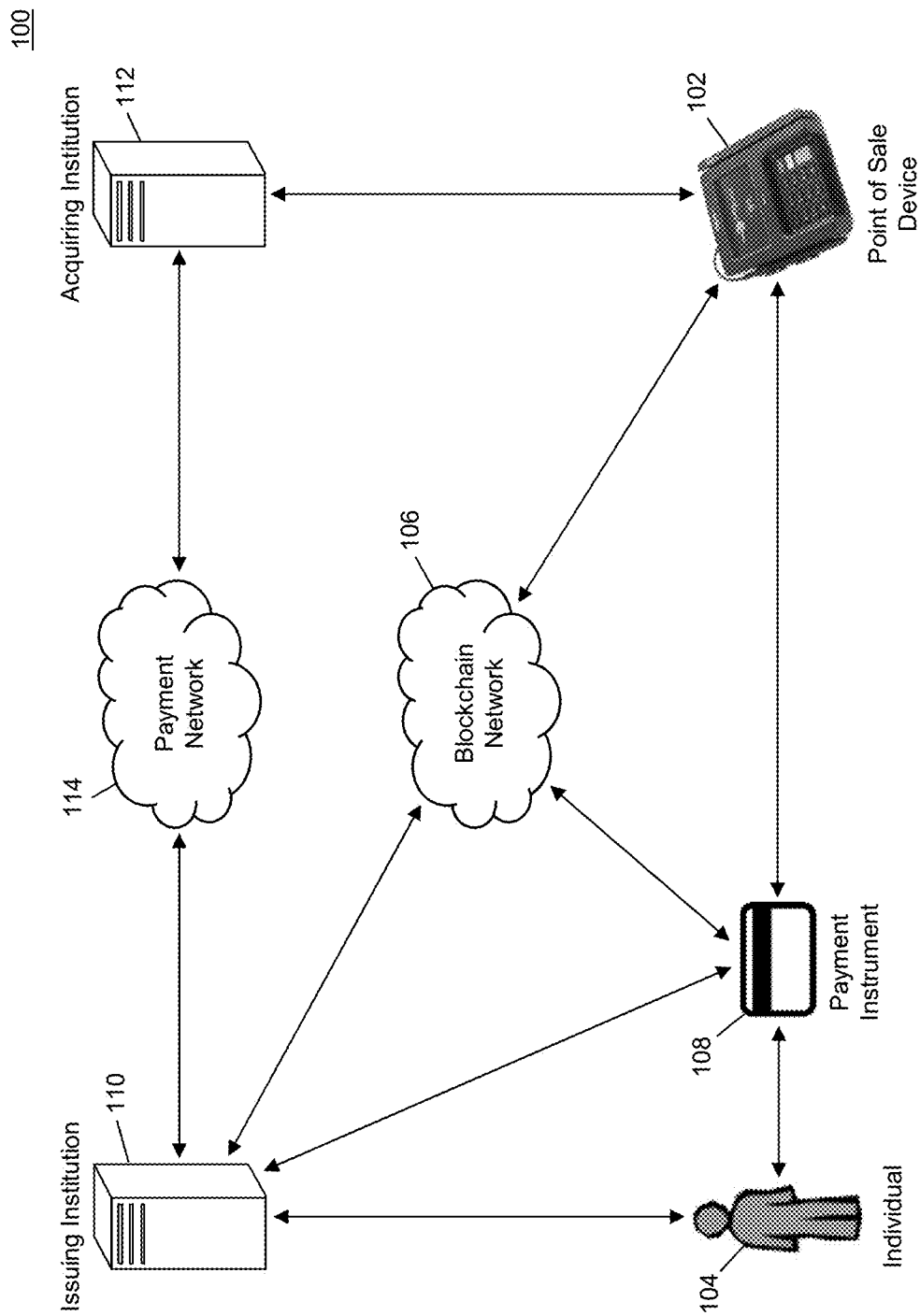
FIG. 1 is a block diagram illustrating a high level system architecture for the authentication and redemption of coupons using a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Authentication of Coupons Via Blockchain

FIG. 1 illustrates a system 100 for the authentication of coupons that are issued for redemption via a specific entity or transaction account and tracked via the use of a blockchain.

The system 100 may include a point of sale device 102. The point of sale device 102, discussed in more detail below, may be part of a merchant system or otherwise associated with a merchant and used to initiate electronic payment transactions for processing, including the application and redemption of coupons. The point of sale device 102 may be any type of traditional point of sale device that is specially configured to perform the functions discussed herein, such as through specialized hardware and software configuration thereof. For instance, the point of sale device 102 may be a specially configured desktop computer or tablet computer that is configured to authenticate coupons using the methods discussed herein.

In the system 100, a coupon may be issued to an individual 104 for redemption at a point of sale device 102. As used herein, "coupon" may refer to a coupon or other deal, discount, offer, reward, etc. that may be redeemed at a point of sale device 102 for a discount or other special benefit as part of an electronic payment transaction. The coupon may be issued to the individual 104 directly by the point of sale device 102 by a merchant associated therewith, or by a third party entity for redemption at the point of sale device 102. The coupon may be issued by generating coupon data that is posted to a blockchain associated with a blockchain network 106 as a transaction included therein. The blockchain network 106 may be a network of a plurality of computing nodes (also referred to herein as "blockchain nodes") that is configured to store and manage a blockchain, including the generation, verification, and addition of new blocks thereto.

The blockchain may be comprised of a plurality of blocks. Each block may be comprised of a block header and a plurality of transaction values. The block header in a block may be comprised of at least a reference to a previous block, a timestamp when the respective block was generated, and a reference to the plurality of transaction values included in the respective block. In an exemplary embodiment, the references included in a blockchain may be hash values generated via the application of one or more hashing algorithms to the associated data. For instance, the reference to the previous block may be a hash value generated via the application of a hashing algorithm to the block header of an earlier block in the blockchain. The use of references may ensure the immutability of the blockchain, as a change to any transaction value in the blockchain would yield a different reference value, requiring the corresponding block header to be changed, which in turn would yield a different reference value for that block header, requiring every single corresponding block to be changed. As such, every block in the blockchain may be verifiable by the calculation of the reference values using the appropriate hashing algorithms.

When a new coupon is issued to an individual 104, coupon data for the coupon may be electronically transmitted to a node in the blockchain network 106 for addition to the blockchain. The coupon data may be accompanied by an identification value associated with the individual 104. In one embodiment, the identification value may be a blockchain address associated with the individual 104. In another embodiment, the identification value may be a digital signature generated by the individual 104 and supplied to the point of sale device 102 (e.g., or other entity issuing the coupon), as discussed in more detail below. The blockchain node may add the coupon data and identification value to a new block to be added as one of the plurality of transaction values. The block may be verified by other nodes in the blockchain network 106 using traditional methods and systems, and then added to the blockchain.

The individual 104 may then proceed to redeem the coupon at a point of sale device 102. The individual 104 may possess a payment instrument 108 that may be configured to convey data to the point of sale device 102 to authenticate the individual's eligibility for redemption of the coupon. The payment instrument 108 may be any type of payment instrument that may be issued to an individual 104 for use in conveying data to a point of sale device 102, including the data discussed herein and payment credentials associated with a transaction account, such as a magnetic stripe card, integrated circuit card, computing device with an electronic wallet application program, etc. In the system 100, an issuing institution 110 may issue a transaction account to the individual 104 for use in funding electronic payment transactions, for which the issuing institution 110 may issue the payment instrument 108 to the individual 104. The issuing institution 110 may be any type of entity configured to issue transaction accounts to individuals 104, such as a financial institution (e.g., an issuing bank).

The payment instrument 108 may thus store the payment credentials associated with the related transaction account, as well as data corresponding to the identification value stored with the coupon data in the blockchain. In embodiments where the identification value may be a blockchain address, the payment instrument 108 may include the blockchain address. In some instances, the payment instrument 108 may include a private key of a key pair, where the private key may be used to generate the blockchain address. In such instances, the payment instrument 108 may convey the generated blockchain address to a point of sale device 102 (e.g., or to a suitable computing device of the issuing entity) for inclusion in the transaction value. In some such instances, the payment instrument 108 may also provide the public key corresponding to the private key in the key pair, which may be used by the point of sale device 102 (e.g., or other issuing entity) to verify the blockchain address.

In embodiments where the identification value may be a digital signature, the digital signature may be generated by the payment instrument 108, such as using a private key of a key pair, where the corresponding public key may be used for verification of the digital signature. In some cases, the digital signature may be generated by the point of sale device 102 (e.g., or issuing entity) via a private key, where the corresponding public key may be electronically transmitted to the payment instrument 108 using a suitable communication method for storage therein.

When the individual 104 wishes to redeem the coupon, the individual 104 may present the payment instrument 108 to the point of sale device 102. The point of sale device 102 may be configured to read the payment credentials stored therein, as well as the data corresponding to the identification value. The data may be read from the payment instrument 108 using any suitable method, such as the reading of data encoded in a magnetic stripe included in the payment instrument 108, receipt of the data via electronic transmission therefrom using near field communication, reading of a machine-readable code displayed by the payment instrument 108 that is encoded with the data, etc. The payment credentials may include a transaction account number and any other data associated with the transaction account that is necessary for the processing of an electronic payment transaction funded by the transaction account, such as a name, expiration date, security code, etc.

The point of sale device 102 may receive the payment credentials and the data associated with the identification value. The point of sale device 102 may then communicate with the blockchain network 106 using a suitable communication network and method to retrieve the transaction values stored therein. The point of sale device 102 may then identify a transaction value corresponding to a coupon that the individual 104 wants to redeem and may verify the individual's authorization to use the coupon. In embodiments where the identification value is a blockchain address, the transaction value may be one that includes that blockchain address. In embodiments where the identification value is a digital signature, the transaction value may be one where a public key provided by the payment instrument 108 successfully validates the digital signature. In some embodiments, a transaction value may include both a blockchain address and a digital signature. In such embodiments, the transaction value may be identified using the blockchain address, and then further authenticated via verification of the digital signature.

The point of sale device 102 may then apply the coupon to an electronic payment transaction to be processed, such as by discounting the transaction amount, adding another product for purchase, or otherwise performing actions related to the redemption of the coupon. The point of sale device 102 may then electronically transmit transaction data for the electronic payment transaction, which includes the payment credentials and following application of the coupon, to an acquiring institution 112 associated therewith for processing. The acquiring institution 112 may be a financial institution, such as an acquiring bank, or other entity configured to issue or otherwise manage transaction accounts used to receive funds as part of electronic payment transactions. The acquiring institution 112 may receive the transaction data and generate a transaction message based thereon that is submitted to a payment network 114 via payment rails associated therewith for processing. The transaction message may be a specially formatted data message that is formatted pursuant to one or more standards governing the exchange of financial transaction messages, such as the International Organization of Standardization's ISO 8583 or 20022 standards.

The payment network 114 may receive the transaction message and may process the electronic payment transaction using traditional methods and systems, which may include seeking authorization or the payment transaction by the issuing institution 110. If the issuing institution 110 authorizes (e.g., approves) the payment transaction, the payment network 114 may return an authorization response to the acquiring institution 112 indicating thusly, which may in turn notify the point of sale device 102 of the successful authorization. The point of sale device 102 may then electronically transmit a new transaction value to the blockchain network 106 that is used to invalidate the coupon such that it may not be used again. The invalidation of the coupon may be accomplished by transferring, via a new blockchain transaction, the coupon data to a new blockchain address that is a null address or an address associated with invalidated coupons. As such, during any future attempts to use the coupon, the point of sale device 102 will identify that it has been transferred to the null or invalidation address, and will identify that it is not eligible for redemption.

In some embodiments, the payment instrument 108 may include a private and/or public key associated with a specific point of sale device 102 or issuing entity. For instance, the payment instrument 108 may have a private key used to generate blockchain addresses used to receive and show possession of coupons issued by a specific point of sale device 102 or issuing entity. In such instances, if the individual 104 wishes to use the same payment instrument 108 for authentication of coupons issued by a different point of sale device 102 or issuing entity, the payment instrument 108 may generate or otherwise possess a different private key of another key pair for use with the corresponding coupons. In some such instances, each point of sale device 102 or issuing entity may use a separate blockchain and/or blockchain network 106.

In other embodiments, the payment instrument 108 may use a single private key for all coupons issued thereto. For example, a plurality of different merchants may each issue coupons to the individual 104, which may be tracked on the blockchain using the private key and corresponding blockchain addresses of the payment instrument 108. In such embodiments, the payment instrument 108 may operate as a universal loyalty card, where each point of sale device 102 (e.g., and associated merchant) may be able to issue rewards and coupons to the individual 104 that are redeemable using the same payment instrument 108.

The methods and systems discussed herein enable an issuing entity to issue coupons that are redeemable only by a specific individual 104, authenticated via their payment instrument 108. As a result, an issuing entity can be sure that coupons that they issue will not be misused, resulting in financial loss, due to the control the entity has over redemption thereof. In addition, the use of a blockchain ensures that the coupons can be properly tracked by the issuing entity and individuals 104, increasing accountability and transparency, while reducing the resources required for implementation of coupons by the issuing entity. Furthermore, the immutability of the blockchain may ensure that coupons may be redeemed with a significantly lower possibility of fraud, resulting in less loss and enabling the issuing entity to increase greater losses with individual coupons to further entice individuals 104.

Point of Sale Device

Figure 2:
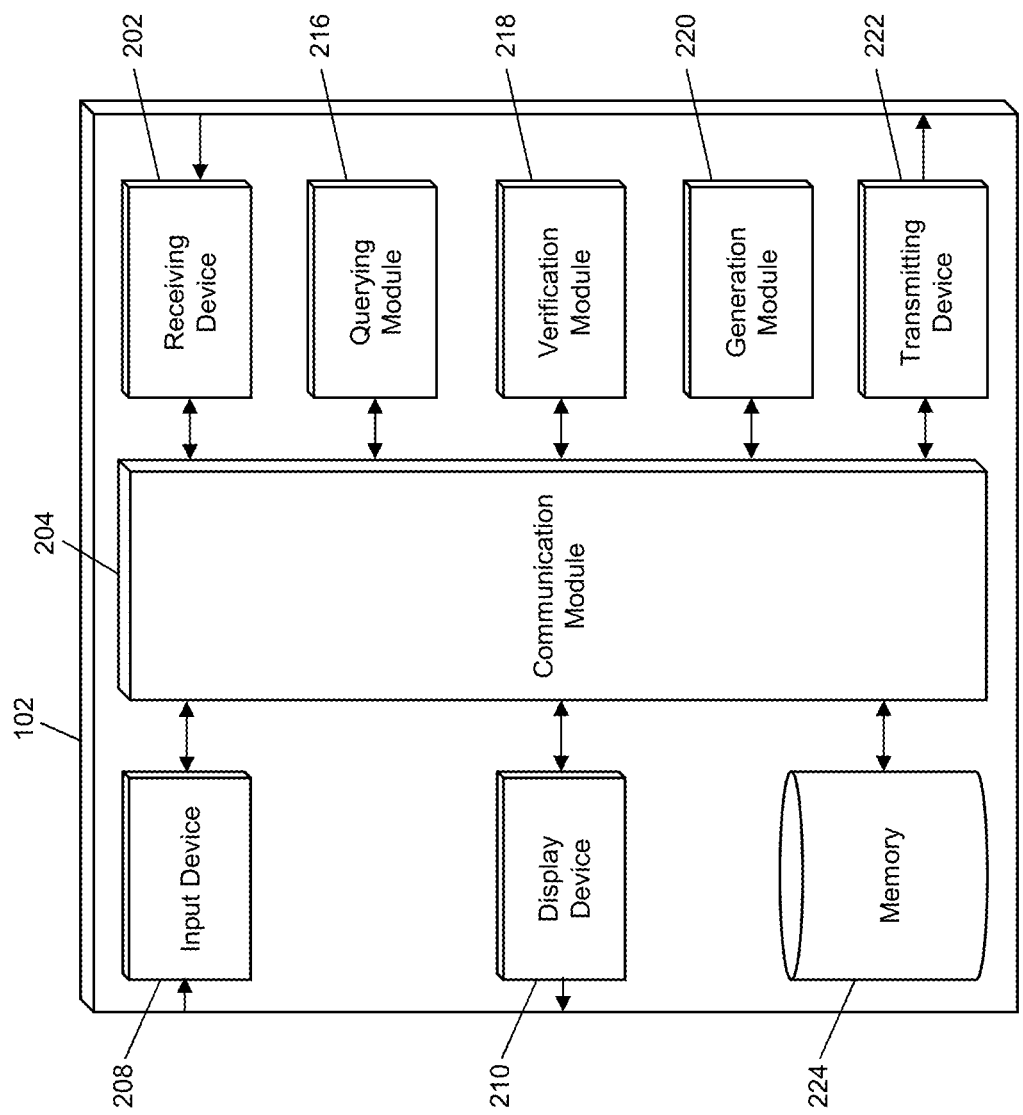
FIG. 2 is a block diagram illustrating the point of sale device of the system of FIG. 1 for authenticating coupons using a blockchain in accordance with exemplary embodiments.

FIG. 2 illustrates an embodiment of a point of sale device 102 in the system 100. It will be apparent to persons having skill in the relevant art that the embodiment of the point of sale device 102 illustrated in FIG. 2 is provided as illustration only and may not be exhaustive to all possible configurations of the point of sale device 102 suitable for performing the functions as discussed herein. For example, the computer system 500 illustrated in FIG. 5 and discussed in more detail below may be a suitable configuration of the point of sale device 102.

The point of sale device 102 may include a receiving device 202. The receiving device 202 may be configured to receive data over one or more networks via one or more network protocols. In some instances, the receiving device 202 may be configured to receive data from payment instruments 108, blockchain networks 106, acquiring institutions 112, and other systems and entities via one or more communication methods, such as near field communication, physical contact points, Bluetooth, local area networks, cellular communication networks, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by blockchain networks 106 by nodes associated therewith, which may be superimposed or otherwise encoded with blockchain data, including blocks and transaction values included therein. The receiving device 202 may also be configured to receive data signals electronically transmitted by acquiring institutions 112, which may be superimposed or otherwise encoded with notifications indicating approval or denial of electronic payment transactions. The receiving device 202 may be further configured to receive data signals electronically transmitted by payment instruments 108, which may be superimposed or otherwise encoded with digital signatures, public keys, blockchain addresses, or other data used in the identification and authentication of coupons stored in the blockchain and the posting of new coupon data thereto.

The point of sale device 102 may also include a communication module 204. The communication module 204 may be configured to transmit data between modules, engines, databases, memories, and other components of the point of sale device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the point of sale device 102 and external components of the point of sale device 102, such as externally connected databases, display devices, input devices, etc. The point of sale device 102 may also include a processing device. The processing device may be configured to perform the functions of the point of sale device 102 discussed herein as will be apparent to persons having skill in the relevant art. In some embodiments, the processing device may include and/or be comprised of a plurality of engines and/or modules specially configured to perform one or more functions of the processing device, such as a querying module 216, verification module 218, generation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The point of sale device 102 may also include a memory 224. The memory 224 may be configured to store data for use by the point of sale device 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the point of sale device 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured, for example, to store blockchain data, digital signatures, private keys, public keys, and other data used in the authentication of coupons using the methods discussed herein.

The point of sale device 102 may also include or be otherwise interfaced with one or more input devices 208. The input devices 208 may be internal to the point of sale device 102 or external to the point of sale device 102 and connected thereto via one or more connections (e.g., wired or wireless) for the transmission of data to and/or from. The input devices 208 may be configured to receive input from a user of the point of sale device 102, such as the individual 104, which may be provided to another module or engine of the point of sale device 102 (e.g., via the communication module 204) for processing accordingly. Input devices 208 may include any type of input device suitable for receiving input for the performing of the functions discussed herein, such as a keyboard, mouse, click wheel, scroll wheel, microphone, touch screen, track pad, camera, optical imager, etc. The input device 208 may be configured to, for example, read data encoded in a magnetic stripe of a payment instrument 108, read a machine-readable code displayed by a payment instrument 108 and decode data encoded therein, or receive data input by the individual 104, where such data may include payment credentials and/or data associated with an identification value stored in a transaction value in the blockchain.

The point of sale device 102 may also include or be otherwise interfaced with a display device 210. The display device 210 may be internal to the point of sale device 102 or external to the point of sale device 102 and connected thereto via one or more connections (e.g., wired or wireless) for the transmission of data to and/or from. The display device 210 may be configured to display data to a user of the point of sale device 102, such as the individual 104. The display device 210 may be any type of display suitable for displaying data as part of the functions discussed herein, such as a liquid crystal display, light emitting diode display, thin film transistor display, capacitive touch display, cathode ray tube display, light projection display, etc. In some instances, the point of sale device 102 may include multiple display devices 210. The display device 210 may be configured to, for example, display data associated with an electronic payment transaction, such as a transaction amount, processing status, approval status, etc.

The point of sale device 102 may include a querying module 216. The querying module 216 may be configured to execute queries on databases to identify information. The querying module 216 may receive one or more data values or query strings, and may execute a query string based thereon on an indicated database, such as the memory, to identify information stored therein. The querying module 216 may then output the identified information to an appropriate engine or module of the point of sale device 102 as necessary. The querying module 216 may, for example, execute a query on the memory 224 to identify transaction values included in blocks received from the blockchain network 106 to identify a transaction value that corresponds to a coupon to be redeemed.

The point of sale device 102 may also include a verification module 218. The verification module 218 may be configured to verify data as part of the functions of the point of sale device 102 as discussed herein. The verification module 218 may receive data to be verified as input, may attempt to verify the data, and may output a result of the attempted verification to another module or engine of the point of sale device 102. The verification module 218 may, for example, verify digital signatures that are included in transaction values identified in the blockchain using public keys received (e.g., by the receiving device 202) from payment instruments 108. The verification module 218 may also be configured to verify eligibility of coupons for redemption based on blockchain data, such as to verify that a coupon was not previously redeemed and has not be transferred to a null address or an address associated with invalidation.

The point of sale device 102 may also include a generation module 220. The generation module 220 may be configured to generate data as part of the functions of the point of sale device 102 as discussed herein. The generation module 220 may receive an instruction as input, may generate data based on the instruction, and may output the generated data to another module or engine of the point of sale device 102. The generation module 220 may, for example, be configured to generate blockchain transaction values, such as may include a coupon identification value and coupon data. Coupon data may include, for instance, a transaction modifier, expiration date, start date, redemption limit, etc. The generation module 220 may also be configured to generate key pairs and/or digital signatures, as applicable, for the performing of the functions discussed herein.

The point of sale device 102 may also include a transmitting device 222. The transmitting device 222 may be configured to transmit data over one or more networks via one or more network protocols. In some instances, the transmitting device 222 may be configured to transmit data to blockchain networks 106, payment instruments 108, acquiring institutions 112, and other entities via one or more communication methods, such as near field communication, physical contact points, Bluetooth, radio frequency, local area networks, cellular communication networks, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to blockchain networks 106 that are superimposed or otherwise encoded with transaction values, which may include coupon identification values and coupon data. The transmitting device 222 may also electronically transmit data signals to blockchain networks 106 that are superimposed or otherwise encoded with data requests, such as to request new blocks or transaction values for review or use thereof by the point of sale device 102. The transmitting device 222 may also be configured to electronically transmit data signals to payment instruments 108, such as may be superimposed or otherwise encoded with private keys, public keys, digital signatures, blockchain addresses, or other data necessary for use by the payment instrument 108 to authentication access thereof to a coupon. The transmitting device 222 may be further configured to electronically transmit data signals to acquiring institutions 112, such as may be superimposed or otherwise encoded with transaction data for the processing of an electronic payment transaction, such as payment credentials, a transaction amount, geographic location, time and/or date, currency type, product data, merchant data, acquirer data, issuer data, reward data, loyalty data, offer data, coupon data, etc.

Process for Authentication of a Coupon

Figure 3A:
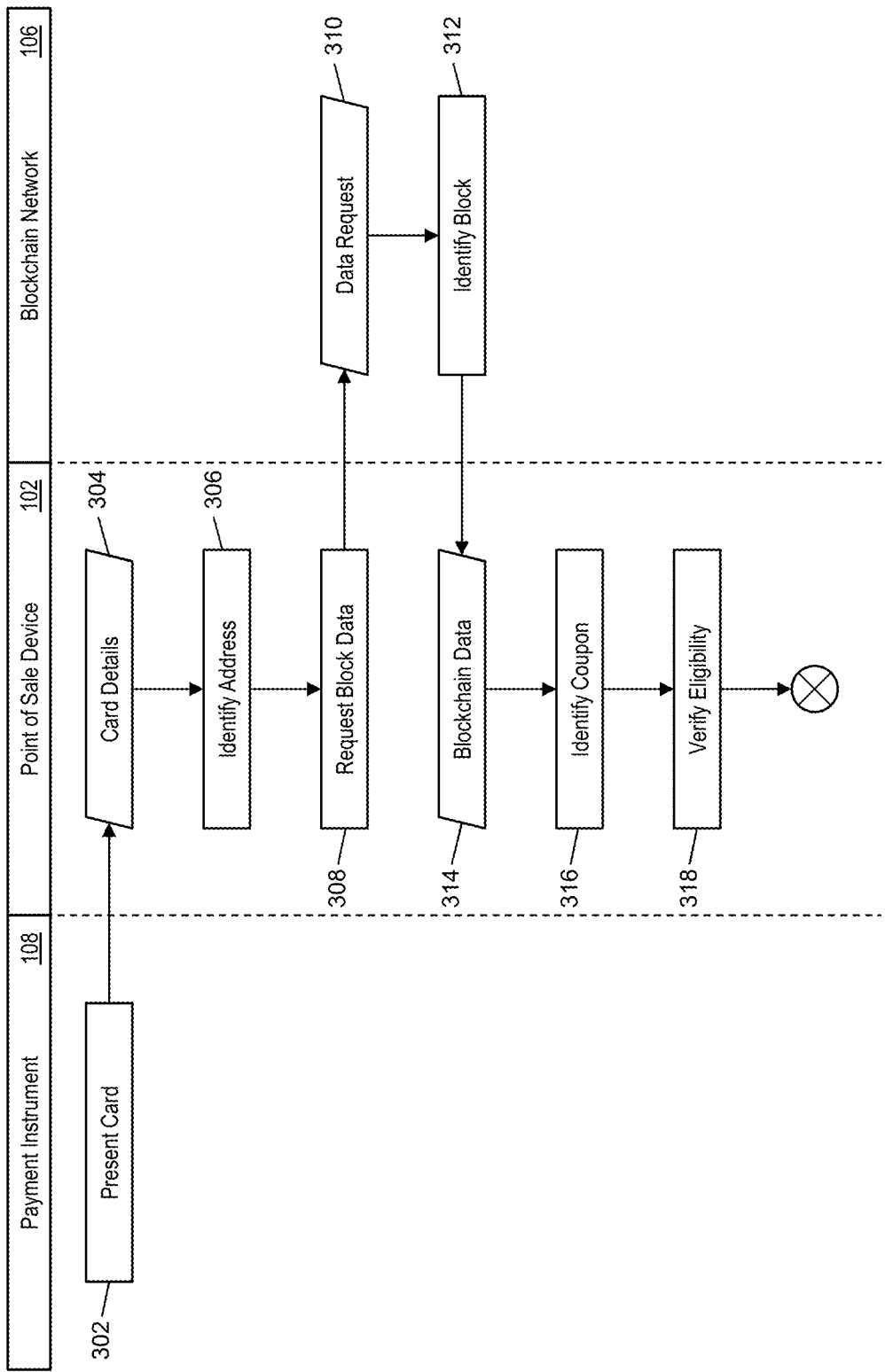
FIGS. 3A and 3B are a flow diagram illustrating a process for the authentication and redemption of a coupon using a blockchain using the system of FIG. 1 in accordance with exemplary embodiments.
Figure 3B:
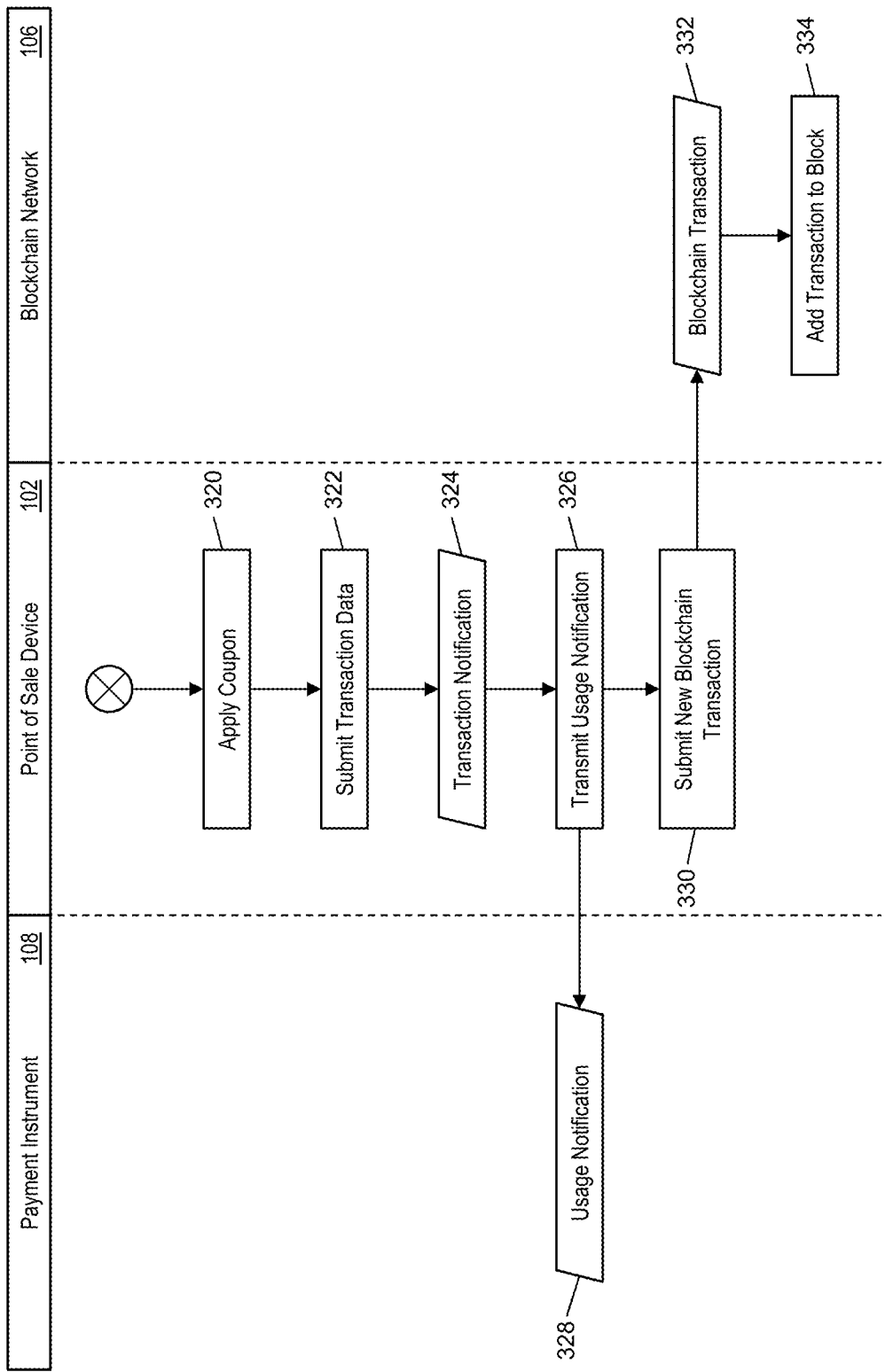

FIGS. 3A and 3B illustrate a process for the authentication of a coupon in the system 100 that utilizes the blockchain network 106.

In step 302, the individual 104 may present the payment instrument 108 to the point of sale device 102 for redemption of a coupon and payment as part of an electronic payment transaction. The presentation of the payment instrument 108 may be based on the type of payment instrument 108. For instance, a magnetic stripe payment card may be swiped through a card reader of the point of sale device 102, while a computing device may electronically transmit data to the point of sale device 102 via near field communication. In step 304, the receiving device 202 of the point of sale device 102 may receive card details from the payment instrument 108. The card details may include at least payment credentials, a blockchain address, and a public key.

In step 306, the querying module 216 of the point of sale device 102 may execute a query on the card details to identify the blockchain address included therein. In step 308, the transmitting device 222 of the point of sale device 102 may electronically transmit a request for block data to the blockchain network 106. In step 310, the blockchain network 106 may receive the request. The request may include at least the blockchain address identified from the card details. In step 312, the blockchain network 106 may identify the transaction value at the blockchain address and electronically transmit it back to the point of sale device 102.

In step 314, the receiving device 202 of the point of sale device 102 may receive the blockchain data. The blockchain data may include at least the transaction value corresponding to the blockchain address. In step 316, the querying module 216 of the point of sale device 102 may execute a query on the received blockchain data to identify the coupon identification value and the coupon data included in the transaction value that corresponds to the blockchain address. In step 318, the verification module 218 of the point of sale device 102 to verify eligibility of the payment instrument 108 and individual 104 to use the coupon. The verification may include, for instance, verifying the coupon identification value using public key in the card details received from the payment instrument 108.

In step 320, the querying module 216 of the point of sale device 102 may execute a query on the memory 224 of the point of sale device 102 to apply the coupon data to transaction data for the electronic payment transaction, such as by modifying a transaction amount based on the coupon data. In step 322, the transmitting device 222 of the point of sale device 104 may electronically transmit the modified transaction data to the acquiring institution 112 for processing of the electronic payment transaction. In step 324, the receiving device 202 of the point of sale device 102 may receive a notification from the acquiring institution 112 indicating that the transaction was approved and processed successfully.

In step 326, the transmitting device 222 of the point of sale device 102 may electronically transmit a notification to the payment instrument 108 that indicates that the coupon was used successfully. In step 328, the payment instrument 108 may receive the notification, which may be used by the payment instrument to delete the blockchain address or otherwise internally indicate that the corresponding coupon has been used. In step 330, the transmitting device 222 of the point of sale device 102 may electronically transmit a new blockchain transaction to the blockchain network 106. The blockchain network 106 may receive the new transaction, in step 332, which may include a transfer of the coupon data to new blockchain address associated with invalidated coupons. In step 334, a new transaction value for the new transaction may be included in a new block that is verified and added to the blockchain.

Exemplary Method for Authentication of Coupons Using a Blockchain

Figure 4:
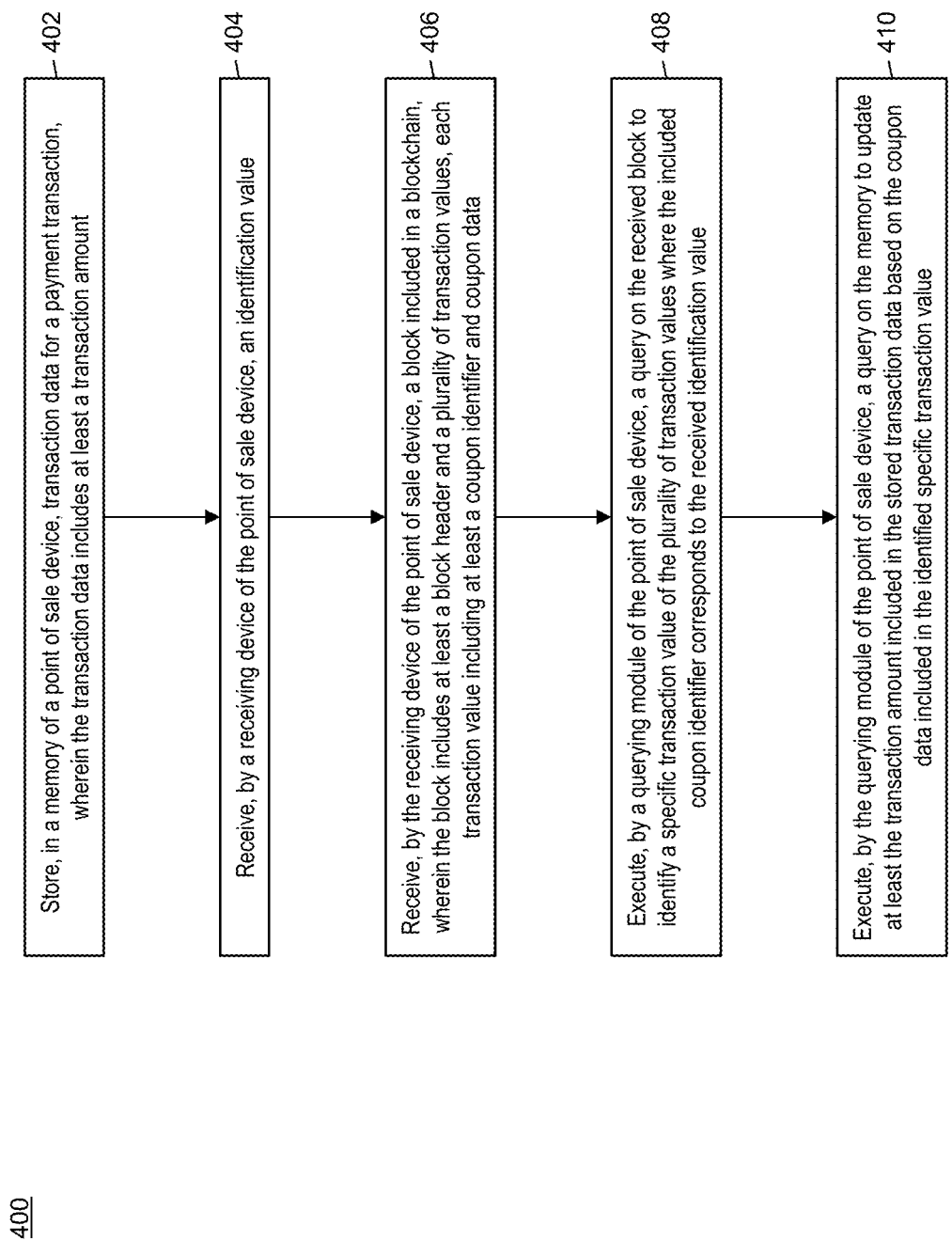
FIG. 4 is a flow chart illustrating an exemplary method for authentication of coupons using a blockchain in accordance with exemplary embodiments.

FIG. 4 illustrates a method 400 for the authentication of coupon that is stored on a blockchain and authenticated using data received as part of an electronic payment transaction.

In step 402, transaction data for a payment transaction may be stored in a memory (e.g., the memory 224) of a point of sale device (e.g., the point of sale device 102), wherein the transaction data includes at least a transaction amount. In step 404, an identification value may be received by a receiving device (e.g., the receiving device 202) of the point of sale device. In step 406, a block included in a blockchain may be received by the receiving device of the point of sale device, wherein the block includes at least a block header and a plurality of transaction values, each transaction value including at least a coupon identifier and coupon data.

In step 408, a query may be executed on the received block by a querying module (e.g., the querying module 216) of the point of sale device to identify a specific transaction value of the plurality of transaction values where the included coupon identifier corresponds to the received identification value. In step 410, a query may be executed on the memory of the point of sale device by the querying module to update at least the transaction amount included in the stored transaction data based on the coupon data included in the identified specific transaction value.

In one embodiment, the identification value may be received from a payment instrument (e.g., the payment instrument 108) through at least one of: decoding of a magnetic strip, a near field communication transmission, and decoding of a displayed machine-readable code. In some embodiments, the identification value may be received as input from an input device (e.g., the input device 208) interfaced with the point of sale device. In one embodiment, the method 400 may further include: verifying, by a verification module (e.g., the verification module 218) of the point of sale device, the coupon identifier included in the identified specific transaction value using the identification value, wherein the identification value is a public key of a key pair, and the coupon identifier is a digital signature generated using a private key corresponding to the public key in the key pair.

In some embodiments, the identification value may be a blockchain address, and the coupon identifier included in the identified specific transaction value is the blockchain address. In one embodiment, the method 400 may also include electronically transmitting, by a transmitting device (e.g., the transmitting device 222) of the point of sale device, at least the stored transaction data including the updated transaction amount to an acquiring financial institution (e.g., the acquiring institution 112) for processing of the payment transaction.

In some embodiments, the method 400 may further include electronically transmitting, by a transmitting device of the point of sale device, a new transaction value to a blockchain node associated with the blockchain, wherein the new transaction value includes at least a reference to the coupon identifier included in the identified specific transaction value and is configured to invalidate the coupon data included in the identified specific transaction value. In a further embodiment, the new transaction value may further include a digital signature, and the digital signature may be received by the receiving device of the point of sale device from a payment instrument used to convey the identification value. In another further embodiment, the new transaction value may further include a blockchain address, and the blockchain address may be one of: a null address and an address associated with invalidated coupons. In yet another further embodiment, the method 400 may even further include receiving, by the receiving device of the processing server, a transaction notification, wherein the transaction notification indicates approval of the payment transaction, and the transaction notification is received prior to electronic transmission of the new transaction value.

Computer System Architecture

Figure 5:
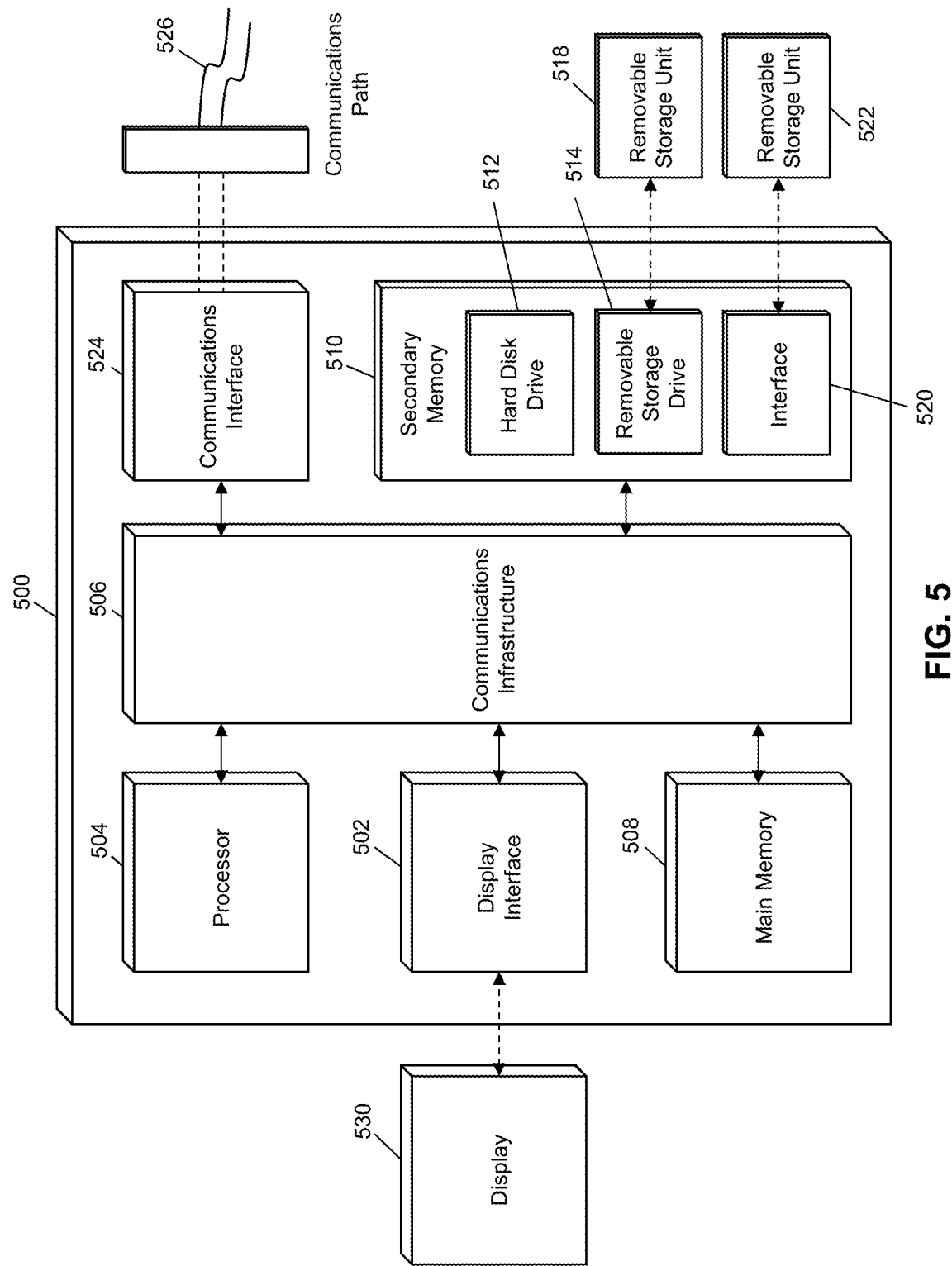
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the point of sale device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for authentication of coupons using a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authentication of coupons using a blockchain, comprising:
    storing, in a memory of a point of sale device, transaction data for a payment transaction, wherein the transaction data includes at least a transaction amount;
    receiving, by a receiver of the point of sale device, an identification value, wherein the identification value is a public key of a cryptographic key pair;
    receiving, by the receiver of the point of sale device, a block included in a blockchain, wherein the block includes at least a block header and a plurality of transaction values, each transaction value including at least a coupon identifier and coupon data;
    executing, by a processor of the point of sale device, a query on the received block to identify a specific transaction value of the plurality of transaction values where the included coupon identifier corresponds to the received identification value;
    identifying, by the processor of the point of sale device, a private key of the cryptographic key pair;
    verifying, by the processor of the point of sale device, the coupon identifier included in the identified specific transaction value using the identification value, wherein the coupon identifier is a digital signature generated using the private key corresponding to the identification value; and
    executing, by the processor of the point of sale device, a query on the memory to update at least the transaction amount included in the stored transaction data based on the coupon data included in the identified specific transaction value.

2. The method of claim 1, wherein the identification value is received from a payment instrument through at least one of: decoding of a magnetic strip, a near field communication transmission, and decoding of a displayed machine-readable code.

3. The method of claim 1, wherein the identification value is received as input from an input device interfaced with the point of sale device.

4. The method of claim 1, wherein
    the identification value is a blockchain address, and
    the coupon identifier included in the identified specific transaction value is the blockchain address.

5. The method of claim 1, further comprising:
    electronically transmitting, by a transmitter of the point of sale device, at least the stored transaction data including the updated transaction amount to an acquiring financial institution for processing of the payment transaction.

6. The method of claim 1, further comprising:
    electronically transmitting, by a transmitter of the point of sale device, a new transaction value to a blockchain node associated with the blockchain, wherein the new transaction value includes at least a reference to the coupon identifier included in the identified specific transaction value and is configured to invalidate the coupon data included in the identified specific transaction value.

7. The method of claim 6, wherein
    the new transaction value further includes a digital signature, and
    the digital signature is received by the receiving device of the point of sale device from a payment instrument used to convey the identification value.

8. The method of claim 6, wherein
    the new transaction value further includes a blockchain address, and
    the blockchain address is one of: a null address and an address associated with invalidated coupons.

9. The method of claim 6, further comprising:
    receiving, by the receiver of the processing server, a transaction notification, wherein
    the transaction notification indicates approval of the payment transaction, and
    the transaction notification is received prior to electronic transmission of the new transaction value.

10. A system for authentication of coupons using a blockchain, comprising:
    a memory of a point of sale device storing transaction data for a payment transaction, wherein the transaction data includes at least a transaction amount;
    a receiver of the point of sale device receiving
        an identification value, wherein the identification value is a public key of a cryptographic key pair, and
        a block included in a blockchain, wherein the block includes at least a block header and a plurality of transaction values, each transaction value including at least a coupon identifier and coupon data; and
    a processor:
        executing a query on the received block to identify a specific transaction value of the plurality of transaction values where the included coupon identifier corresponds to the received identification value,
        identifying a private key of the cryptographic key pair;
        verifying the coupon identifier included in the identified specific transaction value using the identification value, wherein the coupon identifier is a digital signature generated using the private key corresponding to the identification value, and
        executing a query on the memory to update at least the transaction amount included in the stored transaction data based on the coupon data included in the identified specific transaction value.

11. The system of claim 10, wherein the identification value is received from a payment instrument through at least one of: decoding of a magnetic strip, a near field communication transmission, and decoding of a displayed machine-readable code.

12. The system of claim 10, wherein the identification value is received as input from an input device interfaced with the point of sale device.

13. The system of claim 10, wherein
the identification value is a blockchain address, and
the coupon identifier included in the identified specific transaction value is the blockchain address.

14. The system of claim 10, further comprising:
a transmitter of the point of sale device electronically transmitting at least the stored transaction data including the updated transaction amount to an acquiring financial institution for processing of the payment transaction.

15. The system of claim 10, further comprising:
a transmitter of the point of sale device electronically transmitting a new transaction value to a blockchain node associated with the blockchain, wherein the new transaction value includes at least a reference to the coupon identifier included in the identified specific transaction value and is configured to invalidate the coupon data included in the identified specific transaction value.

16. The system of claim 15, wherein
the new transaction value further includes a digital signature, and
the digital signature is received by the receiving device of the point of sale device from a payment instrument used to convey the identification value.

17. The system of claim 15, wherein
the new transaction value further includes a blockchain address, and
the blockchain address is one of: a null address and an address associated with invalidated coupons.

18. The system of claim 15, wherein
The receiver of the processing server further receives a transaction notification,
the transaction notification indicates approval of the payment transaction, and
the transaction notification is received prior to electronic transmission of the new transaction value.

* * * * *